July 9, 1935.  J. S. WILSON ET AL  2,007,514
APPARATUS FOR LOADING VEHICLES IN FREIGHT CARS
Filed March 10, 1932  7 Sheets-Sheet 1
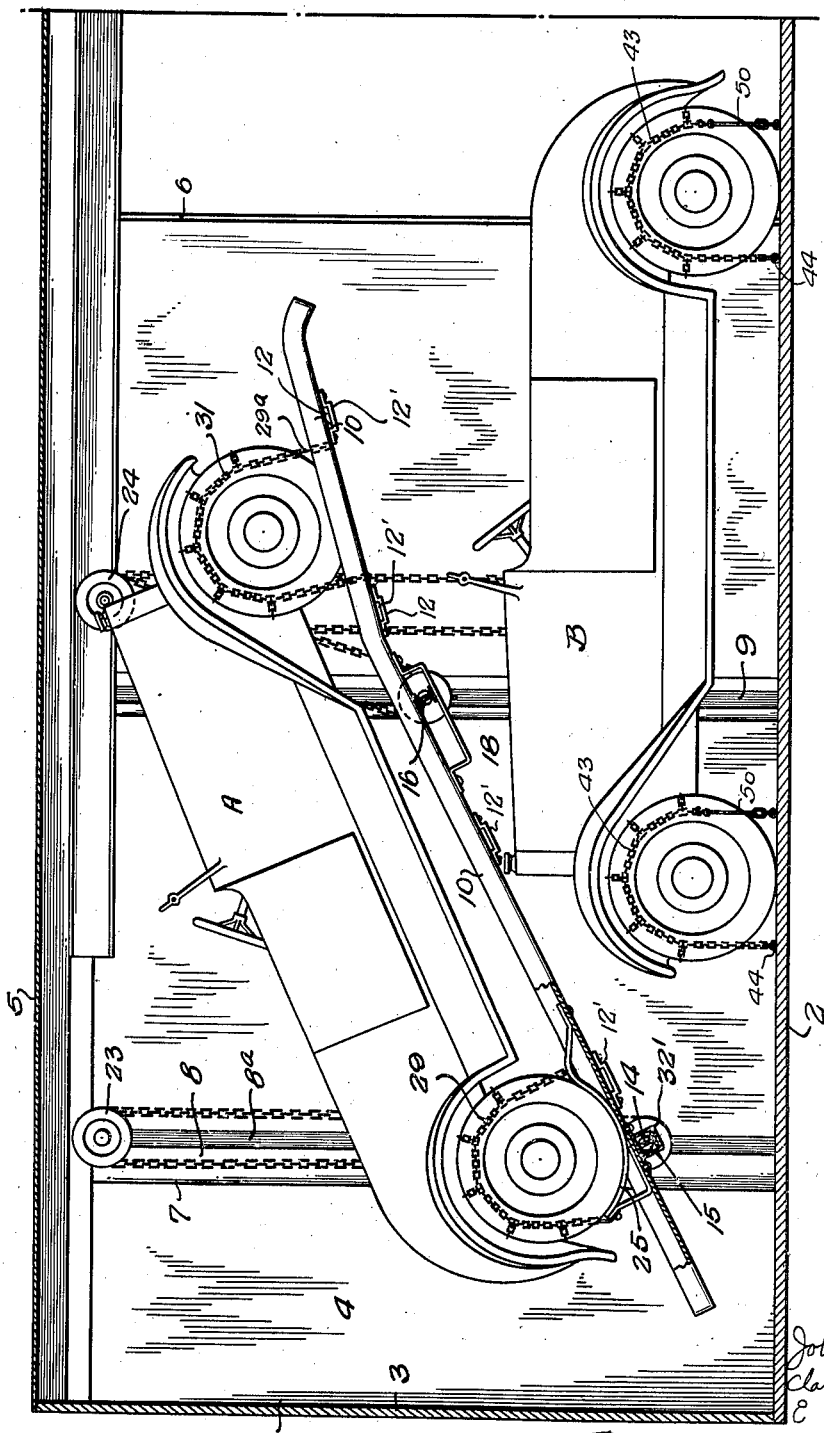

July 9, 1935.  J. S. WILSON ET AL  2,007,514
APPARATUS FOR LOADING VEHICLES IN FREIGHT CARS
Filed March 10, 1932  7 Sheets-Sheet 2
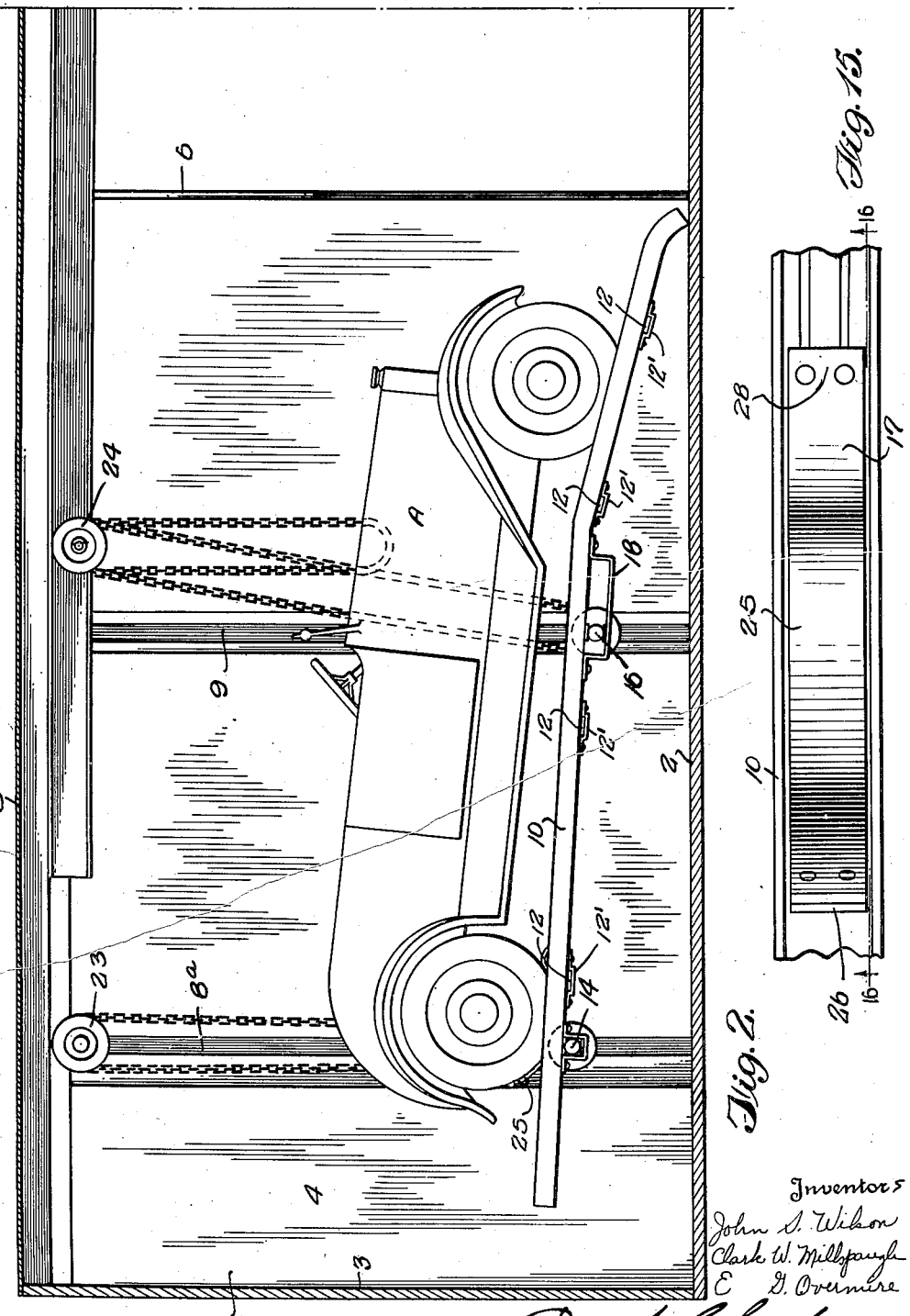

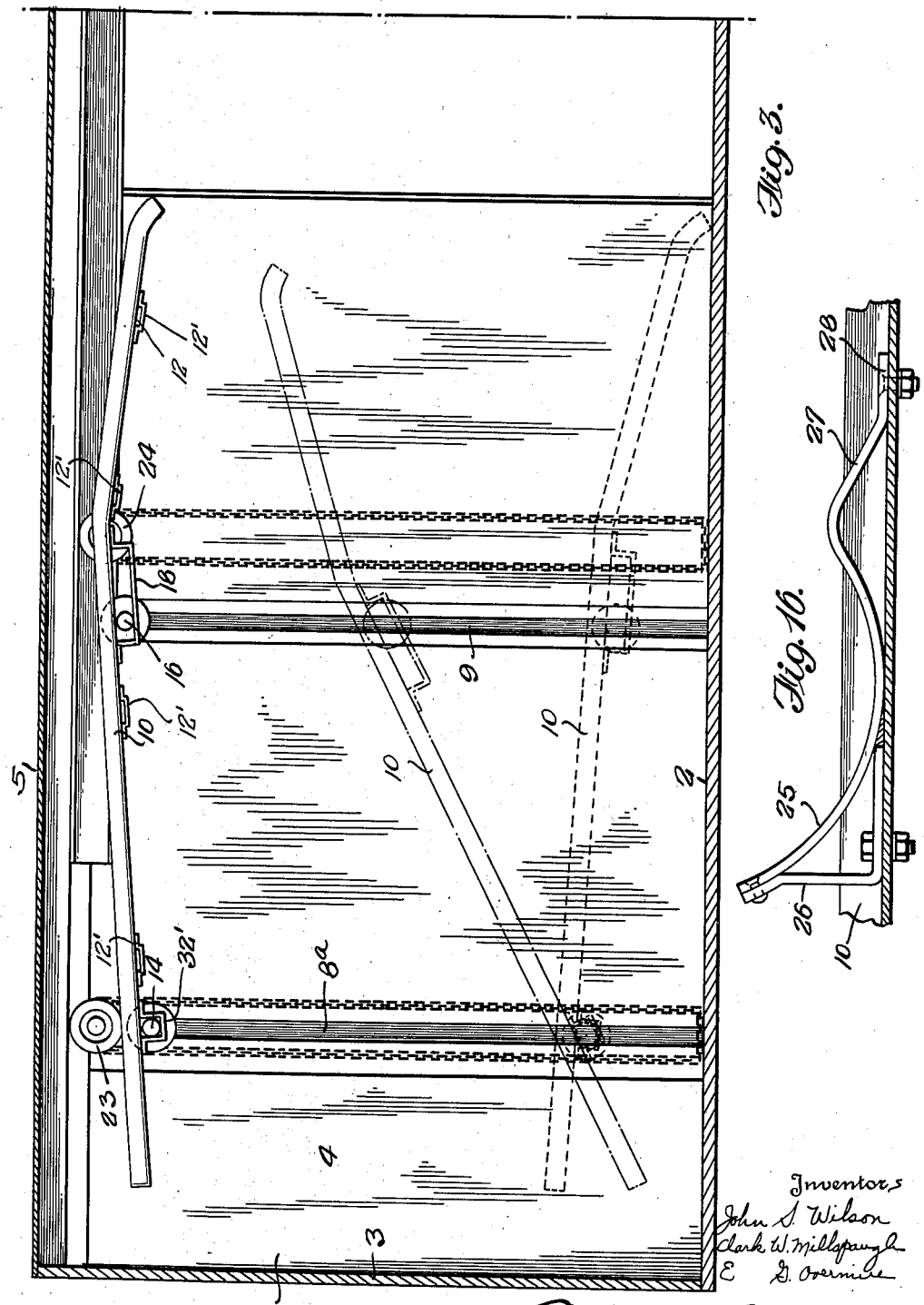

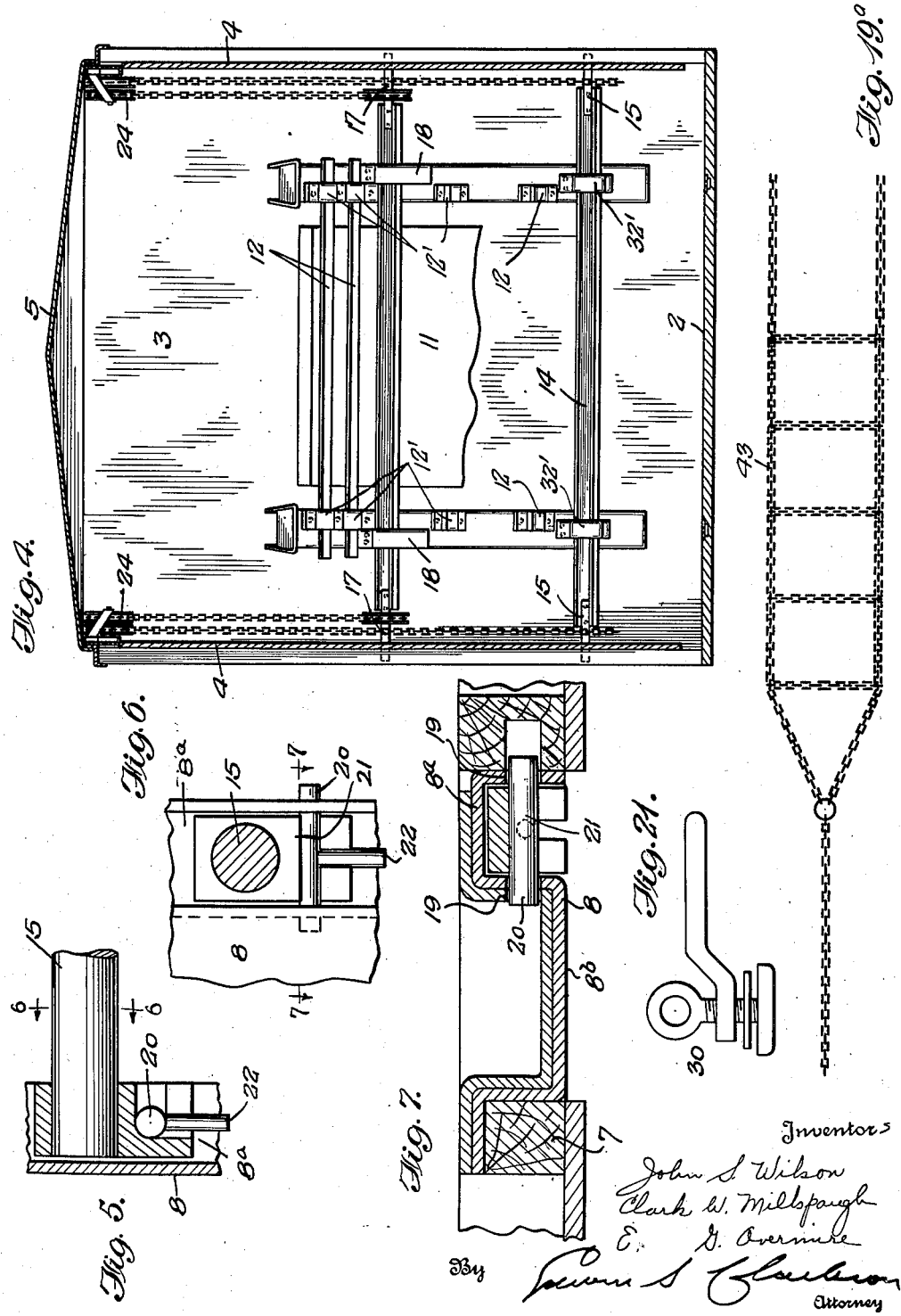

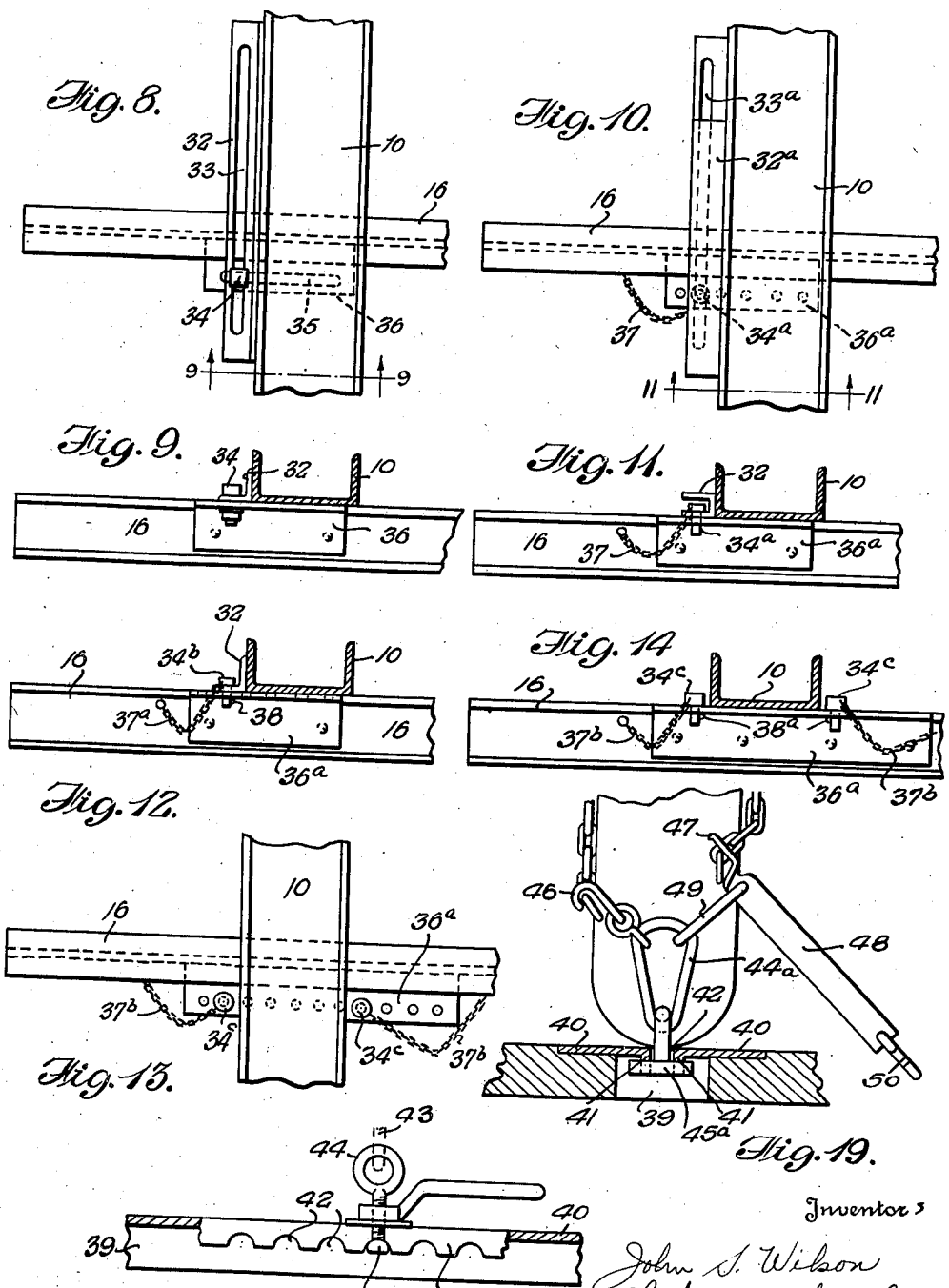

July 9, 1935.                J. S. WILSON ET AL                2,007,514
              APPARATUS FOR LOADING VEHICLES IN FREIGHT CARS
                        Filed March 10, 1932        7 Sheets-Sheet 6
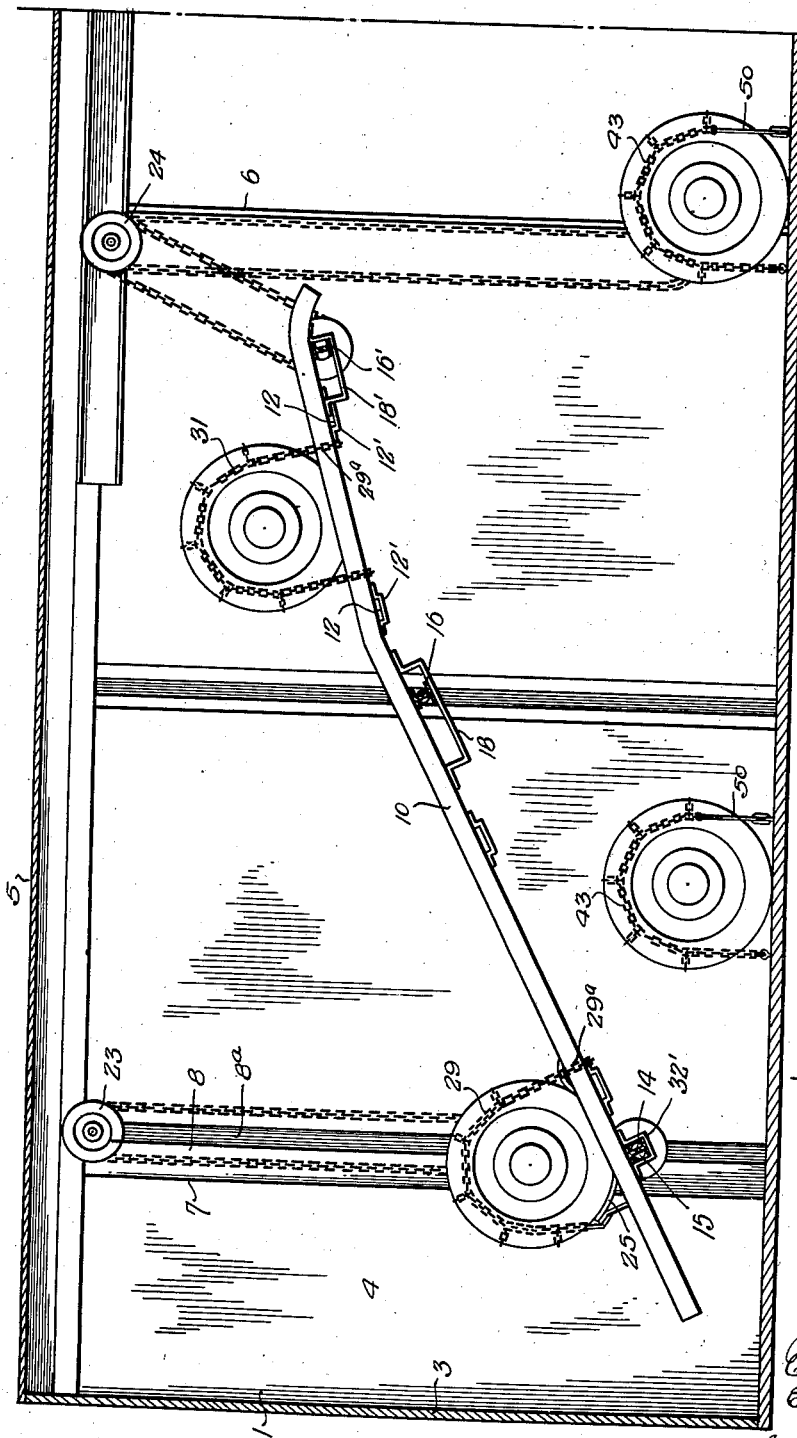
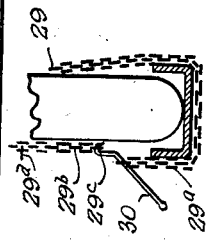
Inventors
John S. Wilson
Clark W. Millspaugh
E. T. Ovenmire
By Edwin S. Clarkson
Attorney Patented July 9, 1935

2,007,514

UNITED STATES PATENT OFFICE 2,007,514

APPARATUS FOR LOADING VEHICLES IN FREIGHT CARS

John S. Wilson and Clark W. Millspaugh, Detroit, Mich., and Edwin G. Overmire, New York, N. Y., assignors to The New York Central Railroad Company, a corporation of New York Application March 10, 1932, Serial No. 598,053

18 Claims. (Cl. 105—368)

This invention relates to improvements in means for the shipment of automobiles in auto-box cars.

One object of the invention is to provide novel and improved means for the shipment of automobiles both in half-decked position and on floors of auto-box cars.

Another object of the invention is to provide a novel supporting frame structure or supporting deck which is adjustable to different sizes of vehicles, and is also adjustable to be employed not only for the transportation of automobiles but also for other articles or commodities.

A still further object of the invention is to provide means for supporting the vehicle supporting frame or supporting deck at any desired height and angle, so as to relieve the weight of the load from the hoisting means while the shipment is in transit.

A still further object of the invention is to provide novel and improved means for supporting automobiles directly on the car floor, beneath the half decked automobiles, by holding or anchoring means engaging the tires of the automobiles and securing the same to the car floor.

With these and other objects in view, the invention consists of the features of construction, combination and arrangement of parts, hereinafter fully described and claimed, reference being had to the accompanying drawings, in which:—

Fig. 1 is a vertical section through one half of a freight car embodying the invention and showing two automobiles loaded therein.

Fig. 2 is a similar view showing the supporting frame in loading position and with an automobile supported thereon.

Fig. 3 is a view similar to Figs. 1 and 2, showing in full lines the supporting frame in position for use of the car loaded with other merchandise than automobiles, and showing in dotted lines the frame in loading position and in dot-and-dash lines the frame in shipping position.

Fig. 4 is a vertical transverse section of Fig. 1 and omitting the automobiles shown therein.

Fig. 5 is an enlarged transverse section of a portion of the supporting frame and its guide connection with a side of the car.

Fig. 6 is a vertical section on line 6—6 of Fig. 5.

Fig. 7 is a horizontal section on line 7—7 of Fig. 6.

Fig. 8 is a top plan view of a portion of the supporting frame showing the adjustable connections between the longitudinal runways and the front transverse frame supporting member or bar.

Fig. 9 is an end elevation of parts shown in Fig. 8.

Figs. 10 and 11, Fig. 11 being an end elevation of parts shown in Fig. 10, are views similar to Figs. 8 and 9, showing a modification of the adjustable connections between the longitudinal runways and the front transverse frame supporting member or bar.

Fig. 12 is a view similar to Fig. 11 showing a modified form of locking pin.

Figs. 13 and 14 are views similar to Figs. 10 and 11, showing another modification of the adjustable connections between the longitudinal runways and the front supporting frame member or bar.

Fig. 15 is a plan view of one of the runway rails and the wheel chock applied thereto.

Fig. 16 is a section through the parts shown in Fig. 15.

Fig. 17 is a section through one of the runways showing the means for connecting a hold down chain to the rack.

Figure 18:
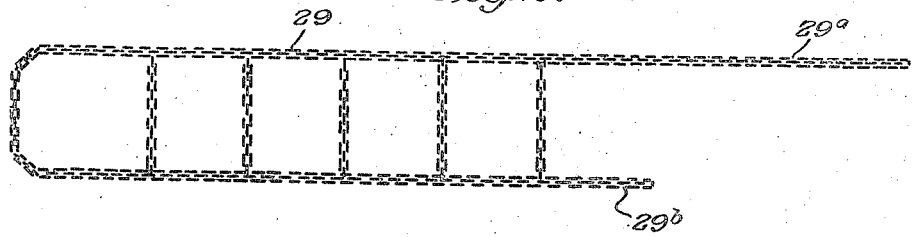

Fig. 18 is a view of a rack hold down chain.

Fig. 19 is a transverse section through a portion of the car floor showing a floor hold down chain and means for fastening the same to the car floor.

Fig. 19a is a view of a floor hold down chain.

Fig. 20 is a longitudinal section through the floor and floor clamp.

Fig. 21 is a detail view of the clamp for holding the wheel chain to the floor.

Figure 22A:
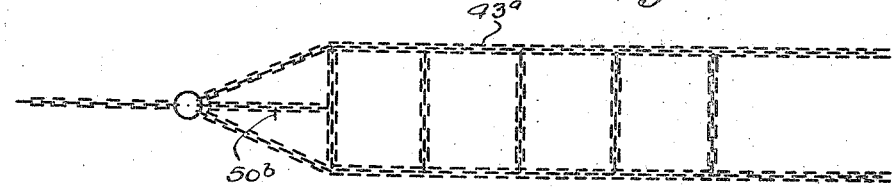
Figure 22:
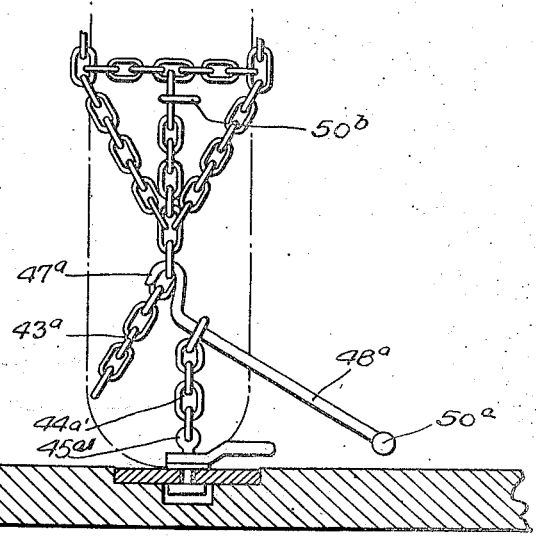

Fig. 22 is a view similar to Fig. 19 showing a modified form of means for holding the vehicle wheel to the floor.

Fig. 22a is a plan view of the floor holding chain shown in Fig. 22.

Fig. 23 is a view similar to Fig. 4, showing a modified arrangement of the rack hoist.

Referring now more particularly to the drawings, the numeral 1 designates a box car of any standard type, including a floor 2, an end wall 3, side walls 4 and a roof 5. The side walls 4 may embody door posts 6 and a series of intermediate posts 7 between the door post and end wall at each side of the car.

Provided in the side walls 4 of the car are guides 8 and 9, preferably comprising channeled iron elements. The guides 8 are each preferably of special construction and consist of a pair of channel members 8a and 8b, respectively facing in opposite directions or toward the outside and inside of the car, said guide 8 being arranged between and secured to adjacent intermediate posts 7. The guides 9 may be of ordinary channel type and are preferably arranged between and secured to a door post and an adjacent intermediate post. The channel members 8 and 9, thus constructed and arranged, are adapted to serve not only as guides and supports for the loading frame, rack or half deck, but also to strengthen and reinforce the posts and side walls generally of the car, while being themselves reinforced and strengthened by the side wall posts so as to provide strong and durable guides and supports for the loading frame or rack.

The frame, rack or half deck on which the vehicle is supported in the car comprises a pair of channeled runways or tracks 10 to receive the wheels of the vehicle, which runways may be rigidly or adjustably united as hereinafter described, to adapt the same for supporting a vehicle of any certain width or to support vehicles varying in width. The runways 10 may serve to support a drip pan 11 disposed between the runways and designed to catch any grease or oil dropping from the raised automobile thereon and preventing the same from falling upon an automobile loaded on the floor beneath the raised automobile. The runways are flared at one end to facilitate the entrance of the wheels of the vehicle. The drip pan is provided with brackets 12 slidably engaging keepers 12' on the runways, allowing the runways to be relatively adjusted without interference therefrom to vary the width of the frame, as hereinafter described.

At its outer or rear end the frame or rack is suitably secured to a transverse combined supporting and fulcrum bar 14, which may be of any cross-sectional shape. The ends 15 of this bar extend beyond the sides of the frame or rack and project into the channels 8a of the guide member 8. Preferably these ends of the bars are rounded to reduce friction between the same and the walls of the channel, and such ends of the bars are movable vertically in the guide channels and are pivotally mounted for rotation therein. Extending transversely of the frame or rack, at a suitable intermediate point between the bar 14 and the inner or front end of the frame, is a second supporting bar 16 having end portions 17 projecting beyond the sides of the frame and slidably and pivotally engaging the channels in the channel irons 9. The ends of the bars are rounded for easy sliding and pivotal motion in the channels 9, but the body portion of the bar 16, like the body portion of the bar 14, may be of any suitable cross-sectional form. The bar 16, instead of being fixed to the runways, like the bar 14, is arranged to loosely engage longitudinal guide brackets 18, which hold the bar connected with the frame, but permit relative sliding movement between the frame and bar thus adapting the bar to move in a straight up and down path and to tilt with the frame in the adjustments of the latter, while adapting the frame, as it is raised or lowered to different inclined positions, to do so without interference from the bar, while maintaining the bar in proper vertical alinement with its hoisting means, hereinafter described.

By reference to Figs. 1, 2 and 3 it will be seen that the vehicle supporting frame or rack is slidable vertically on the extended ends or trunnions of its supporting bars 14 and 16 in the guide channels 8a and 9, and is at the same time pivotally mounted to swing with the bar 14, and on said bar as a horizontal transverse axis, to different heights and degrees of inclination at an angle to the horizontal and with respect to the car floor. As shown particularly in Figs. 1 and 3, the runway frame is adjustable to a suitably inclined supporting position, as indicated in full lines in Fig. 1 and in dot-and-dash lines in Fig. 3, to hold an automobile A (Fig. 1) in such position within the car, or to be adjusted to a lower loading or unloading position, as shown in dotted lines in Fig. 3, or to be adjusted to an upper substantially horizontal storage position, as shown in full lines in Fig. 3, in which it is disposed in an out of the way position, when its use is not desired, so that the car may be employed for the transportation of articles of freight other than automobiles.

The channel 8a is provided in its opposite side walls or webs with series of alined openings 19, adapted to receive the arms 20 of a T-shaped supporting and locking block or pin 21 having a stem or handle 22. The arms 20 of the block 21 are adapted to be inserted in a pair of registering openings 19 beneath the bar 14 in each channel 8a to support said bar at a desired elevation, and to relieve the hoisting means associated with said bar from strain, when the frame or rack is arranged in loading position. In applying the block or pin to the channel 8a, the stem or handle 22 is grasped by the operator and manipulated to insert one of the arms 20 of the block at an angle into an opening 19 in one wall of the channel, and then to insert the other arm 20 of the block into the channel and to slide the block to engage said arm with the registering opening in the opposite side wall of the channel, and the handle 22 is then released and will drop by gravity into the channel, the block thus being disposed beneath the bar 14 to form a support therefor and such operation effecting a locking action between the block and channel, whereby possibility of casual displacement of the block is effectually avoided. The channel 9 may be similarly provided in its side walls with openings for the reception of T-shaped locking blocks or pins of the character described to support the bar 16 in adjusted position in said channel and to relieve the hoisting means associated with said bar from loading strains when the frame or rack is supported in loading position.

Secured at the top of the side walls of the car adjacent the roof are chain hoistings 23 and 24 which may be of similar type, the chains of which hoists pass around pulleys or other guiding means on the extended ends of the bars 14 and 16, whereby the respective bars may be adjusted in their guide channels to the heights desired, and whereby the bar 16 may be raised or lowered to tilt the frame or rack with its load upwardly or downwardly to shipping or loading and discharging position, as will be readily understood. As stated, when the frame is in shipping position, supporting blocks, such as blocks 21, may be applied to the guide channels to form supports for the bars 14 and 16 to relieve or assist in relieving the weight of the load from the chain hoists and to give additional security against any possibility of displacement of the frame while the car is in transit.

In order to hold the vehicle in position on the frame or rack, suitable means may be employed. As shown in the present instance, a wheel chock 25, comprising an arcuate strip of sheet metal, is arranged at the outer end of each runway or track, said strip being secured at its outer end to a reinforcing or brace member 26 and having at its inner end an inclined portion or ramp 27 and an attaching end 28, said brace member and end being perforated for passage of bolts to engage bolt holes or slots at spaced intervals in the runways, whereby the wheel chock may be adjusted to support the wheels of vehicles of different lengths. Associated with each chock is a holding chain 29, consisting of a chain assembly of longitudinal and cross-chains, the longitudinal chain members of which are united at one end of the assembly and left free at the opposite end of the assembly. As shown, the end of the chain assembly at which the longitudinal chain members are connected is fastened to the outer end of the chock and after the chain has been fitted over the tire of the wheel resting on the chock, the free end 29a of one of the longitudinal chain members is passed transversely under or looped about the runway and connected with the free end 29b of the other longitudinal chain member by means of a tension lever 30, whereby the chain is drawn taut and caused to hold the wheel firmly to the runway. This tension lever may be applied to the chain and secured in holding position in any preferred manner. In the example disclosed the lever is slidably and pivotally engaged with a link of the chain end 29a and is provided at one end with a hook 29c to engage a link of the other end 29b of the chain, the other end of the lever forming an operating handle whereby the lever may be manipulated. On the chain is a keeper 29d with which the lever handle end may be engaged to fasten the lever in holding position. The drawings show the rear wheels of the vehicle A resting in and fastened by the chains 29 to the chocks, while the front wheels of the vehicle are shown resting directly on the runways. To secure the front wheels of the vehicle to the runways, chains 31 similar to the chains 29 are employed and secured in position in a similar manner except that the bight portion of each chain is applied to its runway by looping it beneath the runway or fastening it thereto in any suitable or preferred way.

The runway bars or tracks of the frame may be secured to the rear transverse bar 14 by fastenings 32' permitting adjustment of the frame bars relative to each other, that is, to change their spacing for the reception of vehicles of different gages or widths. Other means than that previously described may also be employed for adjustably connecting the bar 16 to permit sliding engagement between the same and the frame runways, as well as to permit the frame runways to be adjustable at this point to vary their spacing.

As shown in Figs. 8 and 9, for example, an L-shaped bracket 32 may be welded to each runway 10 and provided with a longitudinal slot 33 to receive a bolt 34 also passing through a longitudinal slot 35 in a transverse bracket plate 36 secured to the bar 16, whereby a double adjustment of the runway is afforded.

Figs. 10 and 11 show another construction for securing the same result, embodying a channel bracket 32 having in its lower flange a slot 33a to receive a locking pin 34a connected by a loss-preventing chain 37 to the bar 16 and adapted for engagement with openings in a bracket plate 36a secured to bar 16, whereby longitudinal and transverse adjustments of the runway bar is permitted. The top flange of this bracket 32a is cut away at one end to expose an end part of the slot 33a to permit the pin to be fitted in the slot when the frame is in let down position.

Fig. 12 shows a structure similar to that shown in Figs. 8 and 9 with respect to the use of the longitudinal bracket member 32 and to that shown in Figs. 10 and 11 with respect to the use of the perforated transverse bracket plate 36a, together with a locking pin 34b connected with the bar 16 by a loss-preventing chain 37a and having a spring-actuated detent 38 or the like for securing a self-locking action of the pin and preventing its displacement when applied.

Figs. 13 and 14 show a construction in which a bracket plate 36a is employed which is of a length to extend beneath and beyond both sides of the runway 10 and is provided with openings to receive spaced stop pins 34c connected with the bar 16 by loss-preventing chains 37b, such pins having detents 38a and being similar in such respect to the pins 34b, which arrangement prevents relative motion between the parts 10 and 16 transversely of the car, while permitting the parts 10 to move longitudinally, as will be readily understood.

A vehicle supporting frame, rack or half deck of the construction described adapts an automobile A to be supported in an inclined position in the car, leaving an underlying space between the raised automobile and the car floor in which another automobile B may be nested. For the purpose of anchoring the wheels of the vehicle B to the floor, a special construction of anchoring means is provided, as shown in Figs. 19, 20 and 21. To this end, the car floor is formed with a slot 39 and countersunk in the floor at opposite sides of the slot are slot forming holding plates 40, having their approximate edges suitably spaced and provided with downturned flanges 41 formed with registering transverse slots or seat recesses 42. A holding chain 43, similar to an ordinary tire chain, and comprising a chain assembly of side chains and cross chains, has its side chains connected at one end to the eye 44 of a T-shaped anchor bolt 45, which is passed down through the slot between the plates 40 and engaged with certain of the seat recesses 42 to hold such end of the chain in position, while the opposite ends of the side chains are connected, one to a link 44a by means of a hook 46 and the other to the engaging end 47 of a tension lever 48 coupled to the link 44a by a hinge link 49, said link 44a having a T-shaped anchor bolt 45a similar to the bolt 45 connected therewith and adapted to be passed through the slot between the plates 40 and engaged with a pair of seats 42, whereby such end of the chain may be locked in position and the chain placed under tension by adjustment of the lever 48. The engaging end of the lever 48 is preferably forked and said lever provided at its opposite end with a hook 50, whereby it may be connected at such ends with links of the opposite side chain of the chain assembly to lock the lever in applied position. The described construction of the anchoring means adapts the anchor chains to be adjustably applied to the vehicle wheels and car floor for engagement with wheels of vehicles of different wheel bases, and so as to secure the floor supported vehicle B firmly in position against any possibility of movement. The object of countersinking the guide channels 8 and 9 in the side walls and the plates 40 in the floor is to leave the interior of the car free from projections, whereby the car may be used, not only for hauling automobiles but for hauling any kind of merchandise or freight.

In Fig. 22 a modified form of the floor holding chain device is shown in which the structure differs from that shown in Figs. 19 and 20 in that the link member 44a is dispensed with and a tension lever 48a is employed similar to that shown in connection with the chock chain before described, said lever being slidably and pivotally engaged with a link on a short chain 44a' connected with the anchor bolt 45a' and said lever having a hooked end 47a and a handle end 50a, the hooked end being adapted for engagement with a link at the free end of the holding chain 43a, whereby the chain may be drawn taut, and the handle end being engageable with a keeper 50b on the chain 43a to hold the lever in retaining position. With this construction the other end of the chain 43 may be anchored as shown in Fig. 20 by means of one or more of the anchor bolts 45 to the floor or by other approved fastening means.

The holding chains for use on the floor of automobile cars may be so arranged that they cannot be removed from the automobile car, and are stored when not in use in a box or boxes which are depressed level with the floor of the automobile car, and into which the chains can be moved and from which they cannot be removed except to be placed back in use on the floor of the automobile cars.

In Fig. 23 a modified arrangement of the hoist chains for raising and lowering the inner end of the rack is disclosed, the chain hoist 24 being removed from the bar 16 and applied to a bar 16' at the extreme inner end of the rack, said bar 16' being slidably mounted in guide brackets 18' on the runways to allow the bar to adjust itself to required positions in the upward and downward movements of such end of the rack.

From the foregoing description, taken in connection with the drawings, the construction and mode of operation of our improved vehicle loading device for freight cars will be readily understood and its advantages appreciated without a further and extended description. While the constructions disclosed are preferred, it will, of course, be understood that these are merely exemplificative, and that changes in the form, construction and arrangement of parts may be resorted to within the scope of the appended claims, without departing from the spirit or sacrificing any of the advantages of the invention.

What we claim is:

1. In an apparatus for storing vehicles in a freight car, a vehicle supporting frame having longitudinal runways for the wheels of the vehicle, a transverse fulcrum bearing for one end of said frame mounting the frame to tilt in a vertical plane on a horizontal transverse axis, means for guiding and adjusting said fulcrum bearing in a vertical plane, and means for tilting the frame on said bearing in any position of adjustment thereof so as to support a vehicle resting thereon in an inclined position in the car.

2. In an apparatus for loading automobiles in a freight car, the combination with the wall of the car, a channel iron secured to the wall structure of the car, and having a plurality of aligned openings in two of its opposed walls, a bearing block having a substantially T headed slot therein, and a T-shaped locking pin adapted to engage said openings and slot and lie within the iron when in locked position and support the block in position therein.

3. In an apparatus for loading automobiles in a freight car, the combination with vertically disposed channel irons secured to the car side walls, a frame having runways to receive the wheels of an automobile, fulcrum projections at opposite sides of the frame near one end of said frame on which the frame is vertically movable and tiltable, the ends of which project into and are adapted to slide within said channel irons, stops carried by opposing walls of the channel irons, and a substantially T-shaped locking pin designed to engage said stops beneath the fulcrum bar and support said frame and its load in an adjusted position.

4. In an apparatus for loading automobiles in a freight car, the combination with vertically disposed channel irons secured to the car side walls, a frame having longitudinally extending runways to receive the wheels of an automobile, a transverse fulcrum bar secured near one end of said frame, the ends of which project into and are adapted to slide within said channel irons, stops carried by opposing walls of the channel irons, a substantially T-shaped locking pin designed to engage said stops beneath the fulcrum bar and support said frame and its load in an adjusted position, and means to tilt said frame on its fulcrum bar to an inclined position.

5. In an apparatus for storing automobiles in a freight car, the combination with a frame having longitudinally extending runways for the wheels of an automobile, an adjustably mounted fulcrum bar slidably and pivotally engaging the side walls of the car and secured to said frame near one end thereof and on which the frame is tiltable vertically, a raising and supporting bar slidably secured to said frame intermediate its ends, means secured to said supporting bar to raise and lower it to an adjusted position and to tilt the frame on the fulcrum bar, and means to lock the wheels of an automobile on said frame.

6. In an apparatus for loading vehicles in a freight car, the combination with a frame having runways to receive the wheels of a vehicle, supporting bars secured to said frame with their ends projecting beyond the frame and the inner face of the car wall, of a load supporting column set in each car wall and formed of reversely facing integral channels, one channel facing outwardly and the other channel opening into the car and designed to receive the ends of said bars, the latter-named channel having openings in its side walls, the openings in one of said side walls communicating with the outwardly facing channel, and means engageable with said openings to support the bars in said inwardly facing channel in an adjusted position.

7. In an auto-box car, means to load one automobile in the upper portion of the car to afford space therebeneath for a second automobile, including a supporting frame for the first automobile, which comprises a pair of longitudinally extending tracks to receive the front and rear wheels of the automobile, a pair of transversely extending supports for the tracks, one forming a pivotal support for the tracks, means slidably and pivotally connecting said pivotal support with the car side walls, means adjustably connecting the other support to the car side walls for the vertical movement of said support to swing the tracks about the transverse axis of the pivotal support, and a sliding connection between the swinging tracks and vertically movable support adapting the latter to have shifting movement toward and from the pivotal support.

8. Means for loading vehicles for shipment, comprising a vehicle supporting frame including a pair of vertically movable transverse members spaced apart longitudinally a definite distance, one of which forms a pivotal support on which the frame may be vertically tilted, and the other a sliding support movable in a fixed vertical plane, and means connecting the second-named transverse member for longitudinal shifting movement on the frame relative to the first-named transverse member.

9. Means for loading vehicles one above another for shipment, including a vehicle receiving frame, longitudinally spaced supports for the frame, one of which is a pivotal support and another a vertically movable support for swinging the frame bodily about the axis of the pivotal support between lowered loading and elevated shipping positions, means for raising and lowering and tilting the frame, and a keeper connecting the frame and movable support for relative longitudinal shifting movements upon swinging movement of the frame.

10. Equipment for loading vehicles one above another for shipment, including a vehicle receiving frame, longitudinally spaced supports for the frame, one of which is a pivotal support for the frame slidably and pivotally mounted on the side walls of the car and another a vertically movable support for swinging the frame bodily about the axis of the pivotal support between lowered loading and elevated shipping positions, and a bearing member rotatably engaging the vertically movable support and slidably engaging the frame.

11. In an auto freight car, an automobile receiving frame, a support adjacent one end of the frame mounted for vertical adjustment to different elevations in the car and forming a pivotal support about which the frame is bodily swingable to position the opposite end adjacent the car floor for loading purposes or in an intermediate inclined position to support an automobile in such position in the car, or in the upper portion of the car for shipping purposes, and a wheel chock adjustably associated with the frame for accommodating varying lengths of vehicles to be shipped.

12. In an apparatus for loading automobiles upon a freight car, two pairs of guide members on the side walls of the car, a lifting and supporting frame having tracks to receive and support a vehicle on the frame, means on said frame for securing the vehicle thereto, a transverse support on the frame slidably and pivotally engaging one pair of said guide members whereby one end of the frame may be raised and lowered and tilted on said support in said guides, a second transverse support slidably engaging the other pair of guide members and connected to the frame for sliding motion longitudinally thereof, and hoist devices engaging the transverse supports whereby through the described mounting of the supports the opposite ends of the frame may be raised and lowered to the same or different degrees.

13. Means for loading vehicles on a freight car comprising a vehicle receiving frame, longitudinally spaced supports for the frame, one of which is a vertically movable pivotal support and another a vertically movable support, whereby the frame may be swung bodily about the axis of the pivotal support between a lowered vehicle loading and unloading position and an upwardly tilted vehicle supporting position, said vertically movable support being shiftable longitudinally of the frame toward and from the pivotal support in the upward and downward tilting movements of the frame on said pivotal support, and hoisting devices on the car with the respective supports for independently raising and lowering the same.

14. Means for loading vehicles on a freight car comprising pairs of vertical guides at the sides of the car, a vehicle receiving frame, a pair of longitudinally spaced supports for the frame, one of which forms a pivotal support for the frame slidably and pivotally mounted in one of said pairs of guides and the other a vertically movable support slidable in a vertical plane in the other set of guides, whereby the frame may be swung bodily about the axis of the pivotal support between a lowered vehicle loading and unloading position and an upwardly tilted vehicle supporting position, and means connecting the second-named support with the frame for shifting movements thereon toward and from the pivotal support in the upward and downward tilting movements of the frame on said pivotal support.

15. Means for loading vehicles on a freight car comprising pairs of vertical guides at the sides of the car, a vehicle receiving frame, a pair of longitudinally spaced supports for the frame, one of which forms a pivotal support for the frame slidably and pivotally mounted in one of said pairs of guides and the other a vertically movable support slidable in a vertical plane in the other set of guides, whereby the frame may be swung bodily about the axis of the pivotal support between a lowered vehicle loading and unloading position and an upwardly tilted vehicle supporting position, means connecting the second-named support with the frame for shifting movements thereon toward and from the pivotal support in the upward and downward tilting movements of the frame on said pivotal support, and a hoisting device connected with each support.

16. Means for loading vehicles on a freight car comprising pairs of vertical guides at the sides of the car, a vehicle receiving frame, a pair of longitudinally spaced supports for the frame, one of which forms a pivotal support for the frame slidably and pivotally mounted in one of said pairs of guides and the other a vertically movable support slidable in a vertical plane in the other set of guides, whereby the frame may be swung bodily about the axis of the pivotal support between a lowered vehicle loading and unloading position and an upwardly tilted vehicle supporting position, means connecting the second-named support with the frame for shifting movements thereon toward and from the pivotal support in the upward and downward tilting movements of the frame on said pivotal support, and a retaining member adapted to be connected with the first-named guide beneath the pivotal support, said member being detachably engageable with the guide at different elevations.

17. Means for loading vehicles on a freight car comprising pairs of vertical channeled guides at opposite sides of the car, a vehicle receiving frame, spaced transverse supporting bars on the frame, one of said bars being slidably and rotatably mounted in one pair of the guides and forming a vertically adjustable and pivotal support on which the frame may be tilted as an axis between a lowered vehicle loading and unloading position and an upwardly inclined supporting portion and the other bar being slidably mounted in the other pair of guides for movement in a straight vertical path and being slidably movable on the frame toward and from the pivotal supporting bar in the upward and downward tilting movements of the frame, and hoisting devices connected with said bars.

18. In a device for loading vehicles on a box car, a vehicle lifting and supporting rack, means slidably and pivotally connecting said rack at one end to the side walls of the car to adapt said end of the rack to be adjusted vertically and the rack to be tilted between a lower substantially horizontal vehicle receiving and discharging position and an upper inclined vehicle supporting position, means for raising and lowering the rack and holding it in its inclined position, and a pivotal controlling and guiding connection between the rack and car comprising parts relatively shiftable longitudinally of the car to compensate for movement of the rack longitudinally of the car in its arc of tilting motion.

JOHN S. WILSON.
CLARK W. MILLSPAUGH.
EDWIN G. OVERMIRE.